(No Model.)

C. COMSTOCK.
SHORT TURNING VEHICLE.

No. 432,228. Patented July 15, 1890.

Attest:
Charles Pickles.
R. R. Sweet

Inventor:
Charles Comstock.
By Wm M Eccles
his Attorney

UNITED STATES PATENT OFFICE.

CHARLES COMSTOCK, OF INDIANAPOLIS, INDIANA.

SHORT-TURNING VEHICLE.

SPECIFICATION forming part of Letters Patent No. 432,228, dated July 15, 1890.

Application filed March 15, 1890. Serial No. 344,025. (No model.)

*To all whom it may concern:*

Be it known that I, CHARLES COMSTOCK, a citizen of the United States, residing at Indianapolis, in the county of Marion and State of Indiana, have invented a new and useful Improvement in Short-Turning Vehicles, of which the following is a specification.

My invention relates to improvements in short-turning vehicles; and it consists in the arrangement and combination of parts hereinafter described and claimed.

The object of my invention is to construct a cheap and durable short-turning vehicle without cutting under the body or elevating the same above the wheels, and also to so exactly divide the spring action between the longitudinal and transverse springs which support the front platform that said platform will move up and down in parallel planes without turning the axle. I attain these objects by the mechanism illustrated in the accompanying drawings, in which—

Figure 1:
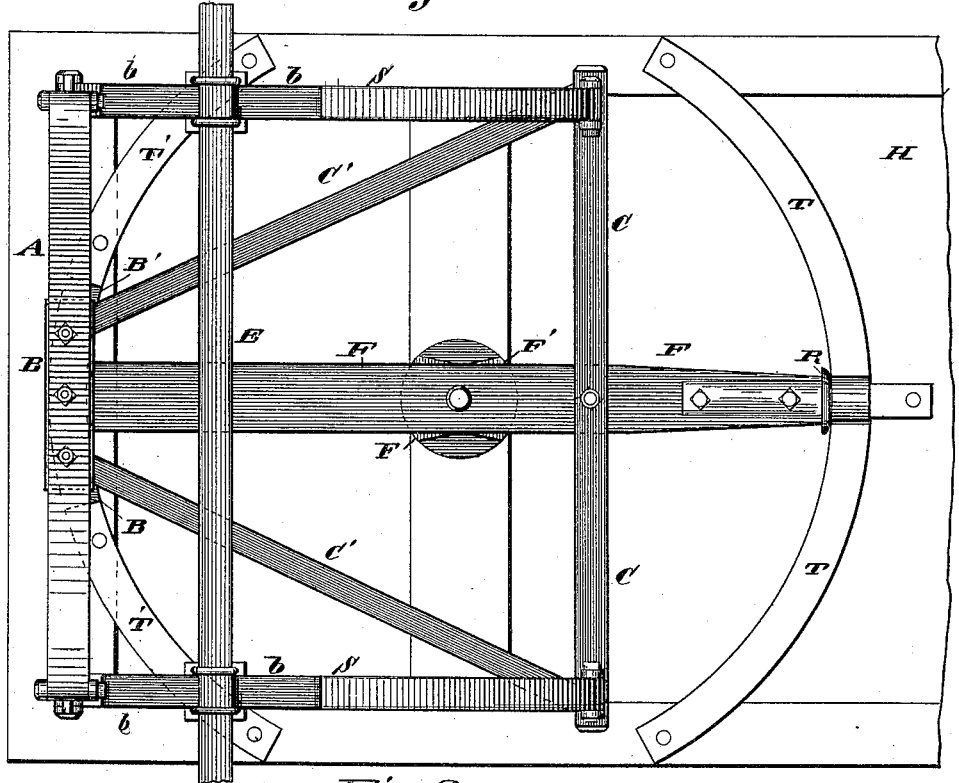
Figure 2:
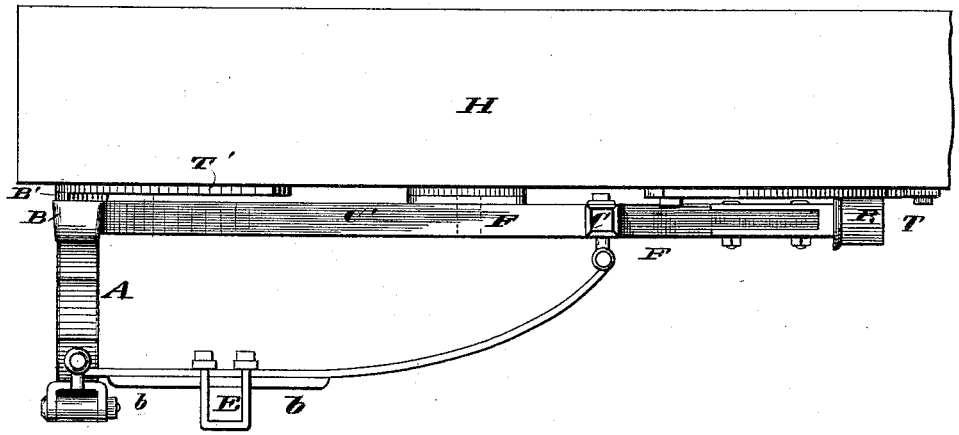

Figure 1 is a bottom view of my short-turning vehicle. Fig. 2 is a side elevation of the same.

A is the front transverse spring shackled at its ends to the short inelastic ends of the longitudinal springs S S and clipped or otherwise secured to the head-block B. The springs S S are sectional springs, each clipped or otherwise secured at the front end of the spring portion thereof to the front axle E, and projecting in front of said axle in an inelastic stub *b* and having its rear portions elastic and made of one leaf and having the sum of the elastic strength of these two rear ends equal to the elastic strength of the front transverse spring. Making the rear portion of the longitudinal springs of a single leaf enables them to be made much shorter than if made stiffer, and thus permits the platform carried by these springs to be considerably contracted in its dimensions over other like vehicles heretofore made.

F is a center longitudinal bar secured in front to the head-block B and near the other end to the cross-piece C. At its rear end is journaled a friction-roller R, which is adapted to traverse a segmental track-plate T on the lower side thereof. This segmental track-plate T is secured to the bottom of the body of the vehicle, and has the same center as corresponding segmental track-plate T', situated in front and secured to the bottom of the body.

H is the body of the vehicle, which is made in the ordinary body shape. The frame-work of the spring-platform consists of the head-block B, longitudinal bar F, cross-piece C, and the two diverging braces C' C'.

B' is a friction-plate on top of the head-block.

The bar F is provided with a transom-plate F', secured to the top of said bar and having a hole for a king-bolt coinciding with the center of the segmental track-plates T and T'. This transom-plate coincides with an upper transom-plate on the bottom of the body. Through both of these passes a king-bolt, with which the platform is pivotally connected to the body behind the axle E, as shown. The advantage of the segmental track-plates T and T' over a track-plate made in one circle is that their common diameter can be made larger than the width of the body, which is very desirable in such kind of vehicles, for the larger the diameter of the track-plate is, the farther the axle E can be set from the center, and consequently the shorter the vehicle can be made to turn.

Now, what I claim as new, and for which I ask Letters Patent of the United States to be granted to me, is—

In a short-turning vehicle, a spring-platform pivotally connected to the body in rear of the front axle and having a friction-roller journaled to the rear of said spring-platform and a friction-plate in front, said friction-roller adapted to traverse the under side of a segmental track-plate secured to the bottom of the body, and said friction-plate adapted to traverse the front segmental plate, likewise secured to the front bottom of the body, in combination with said segmental track-plates, substantially as described, and for the purposes set forth.

CHAS. COMSTOCK.

Attest:
C. J. ROSENBAUM,
ED D. BOREN.